No. 617,575. P. HUNAEUS. Patented Jan. 10, 1899.
GEAR CASE FOR VELOCIPEDES.
(Application filed Sept. 25, 1897.)
(No Model.) 3 Sheets—Sheet 1.
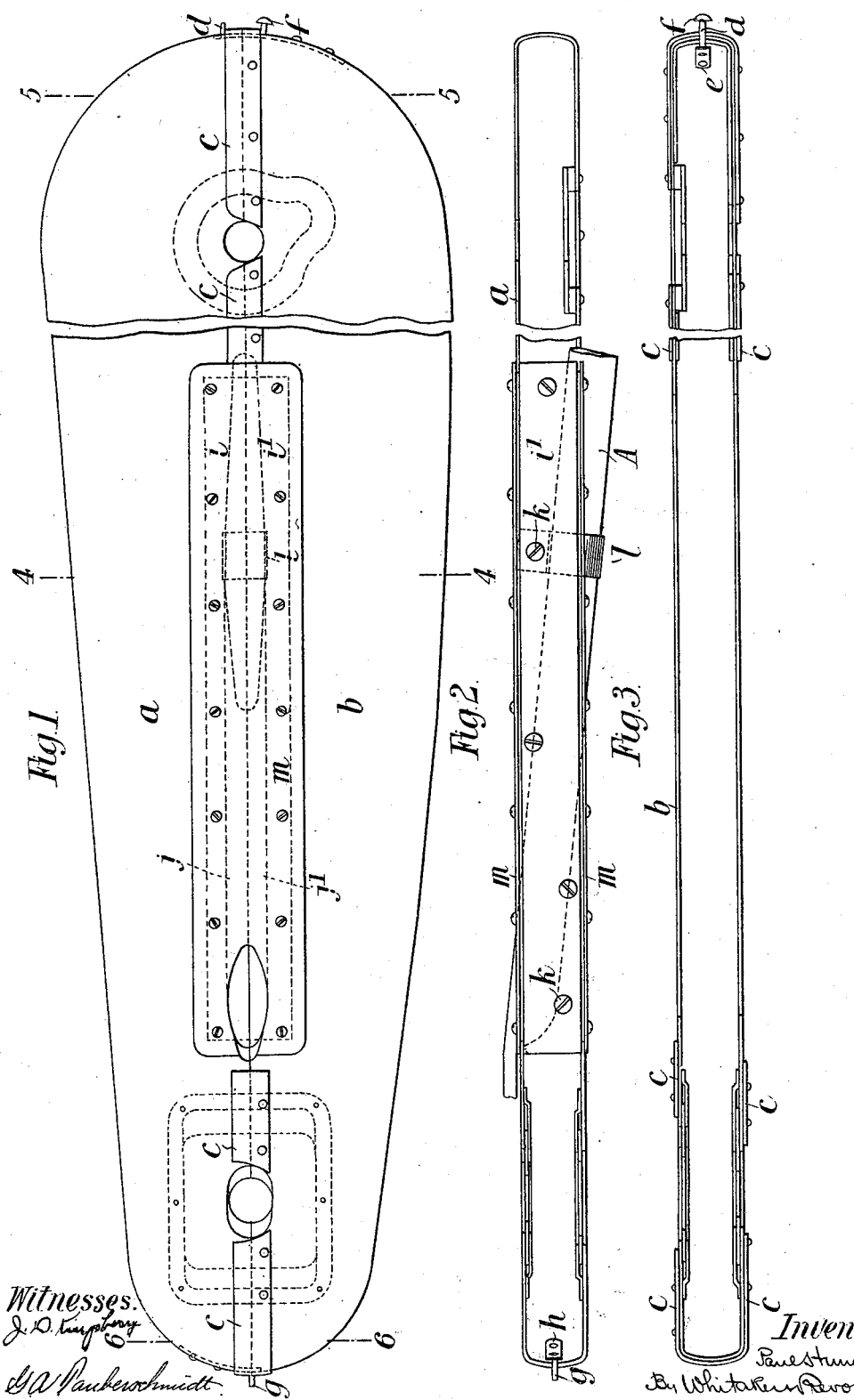

No. 617,575. Patented Jan. 10, 1899.
P. HUNAEUS.
GEAR CASE FOR VELOCIPEDES.
(Application filed Sept. 25, 1897.)
(No Model.) 3 Sheets—Sheet 2.

No. 617,575. Patented Jan. 10, 1899.
P. HUNAEUS.
GEAR CASE FOR VELOCIPEDES.
(Application filed Sept. 25, 1897.)
(No Model.) 3 Sheets—Sheet 3.
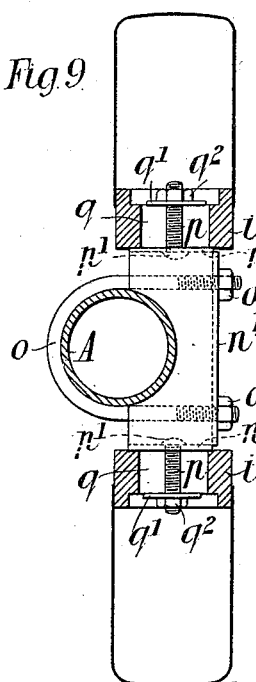
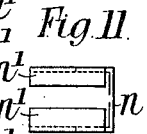
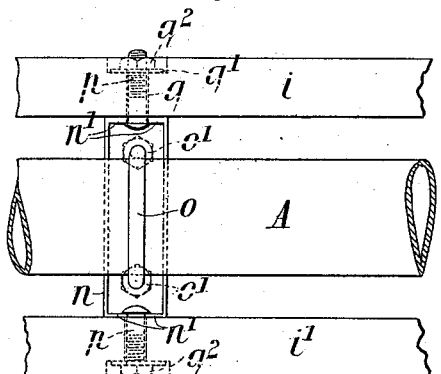
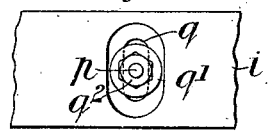
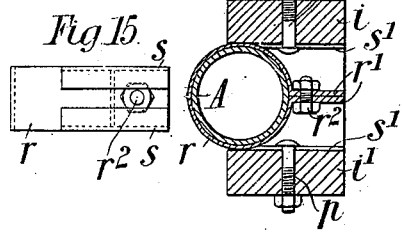
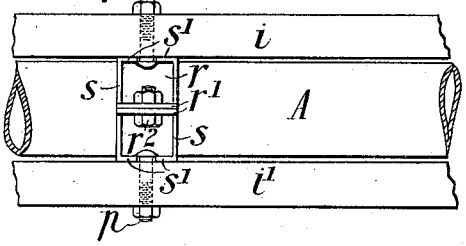
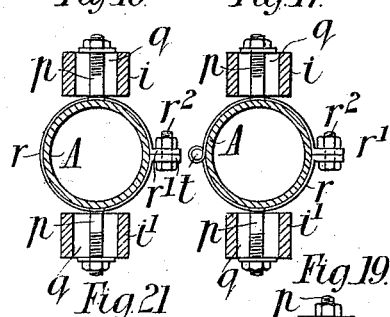
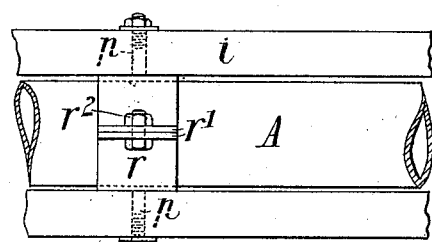
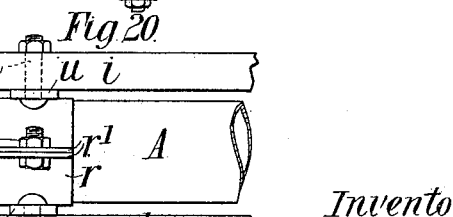
Witnesses. Inventor.

UNITED STATES PATENT OFFICE.

PAUL HUNAEUS, OF LINDEN, GERMANY.

GEAR-CASE FOR VELOCIPEDES.

SPECIFICATION forming part of Letters Patent No. 617,575, dated January 10, 1899.

Application filed September 25, 1897. Serial No. 652,988. (No model.)

*To all whom it may concern:*

Be it known that I, PAUL HUNAEUS, a subject of the Emperor of Germany, residing at Linden, near Hanover, Germany, have invented new and useful Improvements in or Connected with Gear-Cases for Velocipedes, (for which I have obtained patents in Great Britain, No. 22,360, dated November 19, 1894, and No. 17,697, dated August 10, 1896,) of which the following is a specification.

This invention relates to improvements in or connected with gear-cases for velocipedes.

Gear-cases as hitherto generally constructed have the disadvantage that a considerable time has to be expended in connecting and disconnecting the parts thereof; or where the parts have been made capable of being readily connected and disconnected, then, after they have been used for a short time, rattling commences.

The object of my invention is to overcome these objections, and to this end, instead of providing one part of the case with a groove around its edge to receive the edge of the other part of the casing, I provide an intermediate or center piece, to which the two parts or halves of the gear-case can be secured and which is furnished with means whereby it can be fixed upon one of the stay-bars of the velocipede in such a manner that the gear-case is in the same plane as that in which the chain runs.

Figure 4:
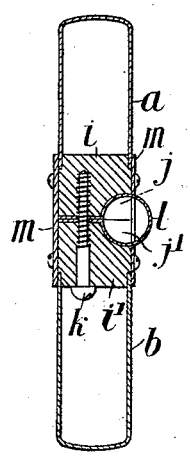
Figure 7:
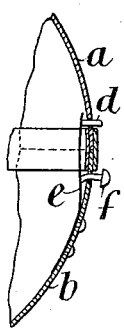
Figure 5:
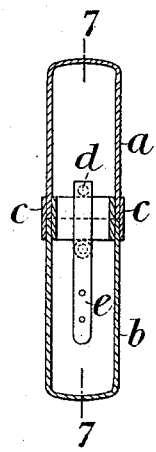
Figure 6:
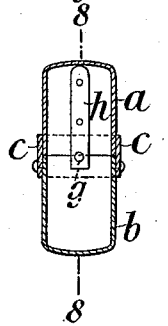
Figure 8:
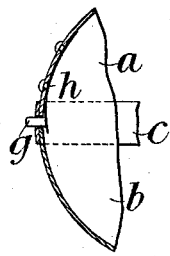

In the accompanying drawings, Figure 1 is a side elevation of a gear-case provided with a center piece according to my invention. Fig. 2 is an under-side view of the upper part or half of the gear-case with the center piece attached thereto and showing it fitted upon the stay-bar of a cycle-frame. Fig. 3 is a plan of the lower part or half of the gear-case. Fig. 4 is a vertical section on the line 4 4, Fig. 1. Fig. 5 is a vertical section on the line 5 5, Fig. 1. Fig. 6 is a vertical section on the line 6 6, Fig. 1. Fig. 7 is a longitudinal section on the line 7 7, Fig. 5. Fig. 8 is a longitudinal section on the line 8 8, Fig. 6. Fig. 9 is a cross-section of a gear-case with a modified form of intermediate or center piece. Fig. 10 is a side view of a part of the said gear-case center piece shown clamped in position upon a stay-bar of a cycle-frame. Figs. 11 and 12 are views of details. Fig. 13 is a cross-section of a further modified construction of center piece. Fig. 14 is a side view of a portion of the same, showing it clamped in position upon a cycle-frame. Fig. 15 is a plan of the clamp thereof. Fig. 16 is a cross-section similar to Fig. 13, but illustrating a slight modification. Figs. 17 and 18 are views similar to Figs. 13 and 14, showing a further modified construction of center piece and clamp; and Figs. 19, 20, and 21 illustrate a further modification.

In the arrangement shown in Figs. 1 to 8, $a$ is the upper and $b$ the lower part of the gear-case, which is preferably made of celluloid. The lower part $b$ of the case is provided at its two ends with strips or bands $c\,c$, of vulcanite, celluloid, or other suitable substance, which strips form grooves or rabbets into which the edge of the upper part enters when the case is put together.

$d$ is a catch attached to the spring $e$, riveted to the lower part of the case, as shown. The catch $d$ enters a hole or eye in the upper part $a$ of the gear-case and is pressed inward through the medium of the knob $f$ when it is desired to release the catch. $g$ is a pin at the other end of the case, the said pin being attached to a strip $h$, riveted to the upper part of the case and entering the hole or eye in the lower part of the case.

$i$ and $i'$ are two strips of wood forming my intermediate or center piece, the said strips being provided, respectively, with grooves $j$ $j'$, which pass obliquely along the same and form, when the strips are screwed together by the screws $k\,k$, an oblique hole of a size to receive the stay-bar A, by means of which hole the said center piece can be fixed thereto.

$l$ is a strip of metal forming a clip on the stay-bar.

$m\,m$ are side plates of celluloid, vulcanite, or the like screwed to the center piece, the edges of which are rabbeted for the purpose of forming grooves adapted to receive the cut-away edges of the upper and lower parts of the gear-case, as shown in Fig. 4.

In the arrangement shown in Figs. 9, 10, 11, and 12 the two strips $i\,i'$ are not grooved to receive the stay-bar, but are provided with a clip or clamp for securing the strips to the stay-bar A, the said clip being formed of a double plate $n$, recessed on its inner edge to the shape of the tube A, as shown in Fig. 9, and of a bent wire or stirrup $o$, which passes around the tube A and is secured at each end to the double plate $n$ by nuts $o'$ $o'$, the said ends being screw-threaded to receive them. By screwing up these nuts the clamp is tightly secured to the tube A. To secure the clamp to the two strips of wood $i$ $i'$ in such a manner that the said strips can be adjusted in position so as to be fixed parallel to the chain of the cycle, the ends $n'$ $n'$ of the two plates $n$ $n$ forming the clamp are turned down at right angles to the plates, (see Fig. 11,) so as to form slots in which bolts $p$ $p$ engage, the said bolts being retained in the slots by their heads $p'$ $p'$. These bolts $p$ $p$ pass through transverse slots $q$ $q$, Figs. 9 and 12, in the strips $i$ $i'$ and are retained in position by washers $q'$ $q'$ and nuts $q^2$ $q^2$, by tightening up which the clamps are securely fixed to the strips $i$ $i'$. With this arrangement it will be obvious that the strips can be adjusted laterally to an extent equal to the length of the transverse slots $q$ $q$ and of the slot formed by the ends $n'$ $n'$ of the plate $n$.

In Figs. 13, 14, and 15 the clamp is shown made of a single piece of sheet metal $r$, bent to the shape of the tube A, to which it is to be fixed, and having its outer ends bent up so as to form flanges $r'$ $r'$, which are secured together by a bolt and nut $r^2$, so as to tighten the clamp to the tube A, onto which it is sprung. The clamp is provided with lateral plates $s$, which are bent downward and inward at their ends $s'$ $s'$, as described with reference to the clamp shown in Figs. 9, 10, and 11, so as to form slots for the engagement of the bolts $p$ $p$. In this modification the strips $i$ $i'$ are shown without the transverse slots $q$ $q$, but they can of course be provided with such slots, if desired.

In the arrangement shown in Fig. 16 the clamp is formed of a strip $r$ of sheet metal made so as to embrace the tube A, to which it is to be clamped. The free ends $r'$ $r'$ of the strip $r$ are turned outward, as in the previous modification, and are adapted to be locked together by the bolt and nut $r^2$. The clamp is adjustably secured to the strips $i$ $i'$ by bolts $p$ $p$, which pass up through the transverse slots $q$ $q$ in the said strips, as in the arrangement described with reference to Figs. 9, 10, 11, and 12, the said bolts $p$ $p$ being soldered or otherwise suitably secured to the clamp $r$.

The clamp shown in Figs. 17 and 18 is similar to that shown in Fig. 16, with the exception that the sheet-metal strip $r$ is hinged at $t$.

In the arrangement illustrated in Figs. 19, 20, and 21 the clamp proper is formed of a strip or plate $r$, with flanges $r'$ $r'$, as in the modification shown in Fig. 16, but it is secured indirectly to the wood strips $i$ $i'$ by the slotted plates $u$ $u$, fixed to the strips $i$ $i'$ by bolts $p$ $p$, which engage with the slots in the plates $u$ $u$, thereby allowing of adjustment.

As above described, it will be obvious that with my improved construction of celluloid gear-cases the said gear-cases can be taken apart for cleaning by pressing the knob $f$ and releasing the catch $d$ to enable the upper part of the case to be removed and by then removing the lower part from the center piece, which remains clamped to the stay-bar. It will also be obvious that by suitably adjusting the strips $i$ $i'$, of which the center piece is composed, the gear-case can be arranged truly parallel with the chain and that it can be readily attached to and removed from the cycle by means of the clamps.

Having now particularly described and ascertained the nature of my said invention and in what manner the same is to be performed, I declare that what I claim is—

1. In a gear-case for bicycles, the combination with the center piece consisting of two parallel strips, having a space between them for the frame-bar, clamps for engaging the stay-bar, adjacent to the ends of said strips and means for adjustably connecting said clamps and strips, whereby said strips can be secured to the said bar and alined with the chain, of the casing-sections adapted to be supported by said center piece, substantially as described.

2. In a gear-case for bicycles, the combination with the center piece consisting of two parallel strips having a space between them for the frame-bar, clamps for engaging said stay-bar, adjacent to the ends of said strips, said clamps being provided with laterally-extending slotted portions securing-bolts engaging said slotted portions and securing them to said strips, whereby said strips can be secured to said bar, in alinement with the chain, of the casing-sections adapted to be detachably secured to the center piece, substantially as described.

3. In a gear-case, the combination with the center piece comprising two parallel strips having a space between them for the frame-bar, plates adjustably secured to said strips adjacent to their ends, each provided with a recess to fit the frame-bar, a stirrup for each plate engaging the frame-bar and having its ends secured to said plate, of the casing-sections adapted to be secured to said center piece, substantially as described.

4. In a gear-case, the combination with the center piece consisting of two parallel strips having a space between them for the passage of the frame-bar, plates disposed transversely of said strips adjacent to their ends and provided with slotted portions, bolts engaging said slotted portions and extending through said strips, said plates being provided with recesses to engage the frame-bar and stirrups engaging said bar and having their ends secured to said plates, of the casing-sections adapted to be secured to said center piece, substantially as described.

PAUL HUNAEUS.

Witnesses:
JOHN KRACKS,
L. KASCH.